(12) United States Patent
Tavlykaev

(10) Patent No.: US 6,978,056 B2
(45) Date of Patent: Dec. 20, 2005

(54) WAVEGUIDE MODULATORS HAVING BIAS CONTROL WITH REDUCED TEMPERATURE DEPENDENCE

(75) Inventor: Robert Tavlykaev, Ellicott City, MD (US)

(73) Assignee: Covega, Inc., Jessup, MD (US)

( * ) Notice: Subject to any disclaimer, the term of this patent is extended or adjusted under 35 U.S.C. 154(b) by 141 days.

(21) Appl. No.: 10/454,077

(22) Filed: Jun. 4, 2003

(65) Prior Publication Data

US 2004/0247225 A1 Dec. 9, 2004

(51) Int. Cl.$^7$ ............................................. G02F 1/035
(52) U.S. Cl. ........................ 385/2; 385/1; 385/14; 385/40; 385/41; 385/129; 385/130; 385/132; 385/8; 385/9
(58) Field of Search ........................... 385/1, 2, 3, 14, 385/39, 40, 41, 42, 129, 130, 132, 141, 8, 9, 131

(56) References Cited

U.S. PATENT DOCUMENTS

| | | | | |
|---|---|---|---|---|
| 5,050,948 A | * | 9/1991 | Hawkins et al. | ............... 385/2 |
| 5,371,812 A | * | 12/1994 | Nakamura | ...................... 385/9 |
| 6,449,080 B1 | * | 9/2002 | McBrien et al. | ............. 359/245 |
| 6,504,640 B2 | | 1/2003 | Gopalakrishnan | ........... 359/245 |
| 6,545,791 B1 | * | 4/2003 | McCaughan et al. | ....... 359/245 |
| 6,646,776 B1 | * | 11/2003 | Cheung et al. | ............. 359/254 |
| 6,714,706 B2 | * | 3/2004 | Kambe | ......................... 385/41 |
| 2004/0151414 A1 | | 8/2004 | Cheung et al. | ................ 385/2 |
| 2004/0247225 A1 | * | 12/2004 | Tavlykaev | ...................... 385/8 |

OTHER PUBLICATIONS

Nadege Courjal, Henri Porte, Anthony Martinez and Jean–Pierre Goedgebuer, LiNbO3 Mach–Zehnder Modulator With Chirp Adjusted by Ferroelectric Domain Inversion, IEEE Photonics Technology Letters, Nov. 2002, pp. 1509–1511, vol. 14, No. 11, IEEE.

* cited by examiner

Primary Examiner—Brian M. Healy
(74) Attorney, Agent, or Firm—Potomac Patent Group PLLC

(57) ABSTRACT

Optical modulators with reduced temperature dependence on bias control are described. A set of bias electrodes is arranged relative to a set of RF electrodes in a manner which results in the opening point of the device remaining relatively constant as a function of temperature. The arrangement of the bias electrodes relative to the RF electrodes includes a physical offset of one set of electrodes relative to the other, with or without a reversal of polarity of one set of electrodes relative to the other. Arrangements according to the present invention create a symmetrical electrode arrangement from a temperature-induced stress point of view so that the operating point of the device remains relatively constant as a function of temperature.

31 Claims, 6 Drawing Sheets

WAVEGUIDE MODULATORS HAVING BIAS CONTROL WITH REDUCED TEMPERATURE DEPENDENCE

BACKGROUND

The present invention relates generally to optical modulators and, more particularly, to optical modulators having electrodes proximate waveguides for biasing optical outputs.

Technologies associated with the communication of information have evolved rapidly over the last several decades. Optical information communication technologies have evolved as the technology of choice for backbone information communication systems due to, among other things, their ability to provide large bandwidth, fast transmission speeds and high channel quality. Optical modulators are used to impress data onto optical carriers for transmission through optical fiber.

Compared to their bulk counterparts, guided-wave electro-optic modulators offer a drastic reduction in the required driving power combined with a bandwidth extending well into the 40 GHz band. In an electro-optic modulator, an electric signal is applied to electrodes embedded in a substrate and proximate to the waveguide(s), to induce an electric field which in turn causes, via the electro-optic effect, phase modulation. The latter is typically converted into amplitude modulation by redistributing light among output channels, of which some may correspond to guided modes and others to radiation modes.

Figure 1A:
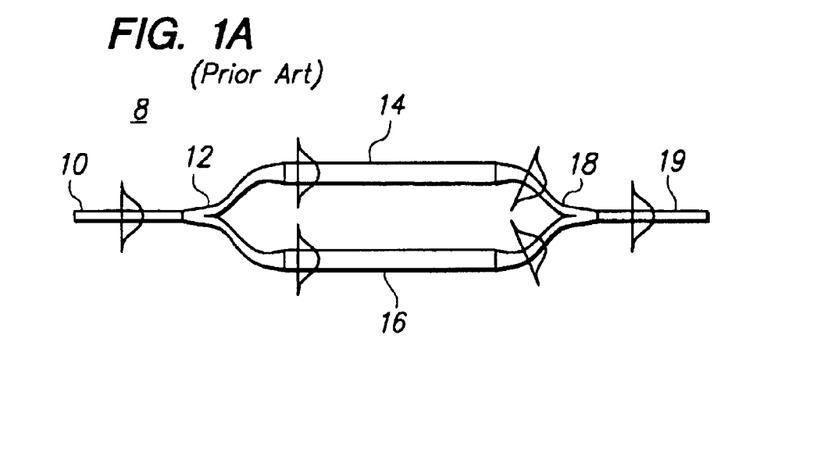
FIG. 1(a) depicts a conventional waveguide MZI with fundamental mode excitation.
Figure 1B:
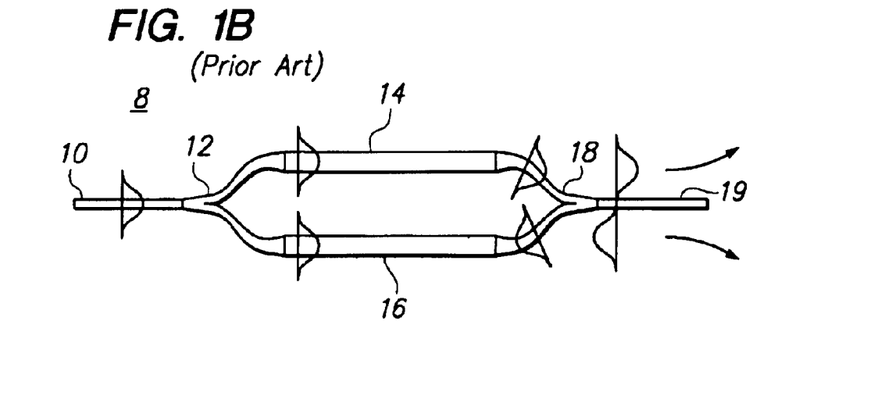
FIG. 1(b) depicts a conventional waveguide MZI with first-order mode excitation.

One example of a guided-wave, electro-optic modulator is the Mach-Zehnder interferometer (MZI). As shown in FIGS. 1(a) and 1(b), the waveguide 8 of an MZI typically includes an input section 10, a symmetric input Y-junction 12, two interferometer arms 14 and 16, a symmetric output Y-junction 18, and an output section 19. The input Y-junction 12 splits light launched into the input section 10 into two waves propagating through the interferometer arms 14 and 16. The waves are combined and interfere, with a certain phase difference between them, in the output Y-junction 18. The differential phase determines the split of optical power between the fundamental (even, FIG. 1(a)) and first-order (odd, FIG. 1(b)) mode. The output single-mode section 19 supports the fundamental mode but rejects the first-order mode, which is below cut-off and diffracts into the substrate as it propagates towards the output endface of the substrate. If the differential phase equals an even integer of pi, only the fundamental mode is excited in the output Y-junction 18 and propagates, with very little loss, through the output section 19. However, when the differential phase is an odd integer of pi, only the first-order mode is excited in the output Y-junction 18 and subsequently rejected by the output section 19. The differential phase is affected by asymmetries that the interferometer arms 14 and 16 may have, referred to herein as intrinsic bias, as well as by a voltage applied to electrodes (not shown in FIGS. 1(a) and 1(b)) that are disposed proximate the interferometer arms. As discussed in more detail below, with respect to FIG. 2, the voltage applied to these electrodes is used to control the differential phase and achieve amplitude modulation of the optical carrier.

The intrinsic bias of the interferometer is affected by many factors, such as asymmetries (intentional or caused by fabrication tolerances), temperature, surface condition, etc. Of these factors, temperature should be considered in most applications, since typically no temperature stabilization is permitted in commercial, packaged devices. It is known that the temperature dependence of bias is caused by at least two components, one being a surface-state-related bias drift and the other an electrode-introduced stress. The drift component accounts for non-reversible changes in bias that are temperature dependent but do not directly follow changes in temperature. For example, when the modulator goes through the up-ramp of a temperature cycle and subsequently through a symmetric down-ramp, the bias after the cycle does not return to the pre-cycle value and is in fact determined by the whole history of previous temperature changes. On the other hand, the electrode-introduced stress produces, via the elasto-optic effect, a bias component that is uniquely determined by temperature. If, in the above exemplary modulator of FIGS. 1(a) and 1(b), only the stress component of bias would be present, such a modulator could undergo multiple symmetric temperature cycles with its operating point following the same curve during a cycle and returning to the starting point at the end of the cycle.

Accordingly, Applicant would like to provide modulators and methods of making and operating modulators which substantially reduce or eliminate the stress-induced temperature dependent component of bias in such devices.

SUMMARY

Optical modulators with reduced temperature dependence of intrinsic bias are described. A set of bias electrodes is arranged relative to a set of RF electrodes in a manner which results in the operating point of the device remaining relatively constant as a function of temperature. The arrangement of the bias electrodes relative to the RF electrodes includes a physical offset of one set of electrodes relative to the other, with or without a reversal of polarity of one set of electrodes relative to the other.

According to one exemplary embodiment of the present invention, an optical modulator includes a substrate; an optical waveguide formed in the substrate; a first set of electrodes provided on the substrate proximate the optical waveguide for establishing an electric field therebetween to modulate the optical signal, the first set of electrodes including two ground electrodes and one RF potential electrode; and a second set of electrodes provided on the substrate proximate the optical waveguide for establishing an electric field therebetween to bias the optical modulator, the second set of electrodes including one ground electrode and two bias potential electrodes.

According to another exemplary embodiment of the present invention, an optical modulator includes a substrate, an optical waveguide formed in the substrate; a first set of electrodes provided on the substrate for establishing an electric field therebetween to modulate the optical signal, the first set of electrodes including two ground electrodes and one RF potential electrode; and a second set of electrodes provided on the substrate for establishing an electric field therebetween to bias the optical modulator, the second set of electrodes including two ground electrodes and one bias potential electrode; wherein a center of the one RF potential electrode is offset from a center of the one bias potential electrode by a predetermined distance relative to an axis running through the optical waveguide.

According to yet another exemplary embodiment of the present invention, waveguide means for guiding an optical signal through the optical modulator; electrical modulation means for modulating the optical signal, and bias means for biasing the optical modulator, wherein the electrical modulation means and the bias means are arranged in a manner which reduces a temperature dependence of the bias means.

According to a still further embodiment of the present invention, a method for making optical modulators includes the steps of providing a substrate; forming a waveguide in the substrate for guiding an optical signal through the optical modulator; disposing a first set of electrodes on the substrate for modulating the optical signal; disposing a second set of electrodes on the substrate for biasing the optical modulator; and arranging the first set of electrodes and the second set of electrodes to reduce a temperature dependence of the biasing of the optical modulator.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Devices and methods according to exemplary embodiments of the present invention provide waveguide optical modulators having biasing circuits with reduced temperature dependence as compared with conventional modulators. The purely exemplary embodiments discussed herein involve modulators employing MZIs, however those skilled in the art will appreciate that the present invention is equally applicable to any waveguide optical modulators where electrodes are positioned proximate waveguides.

Figure 2A:
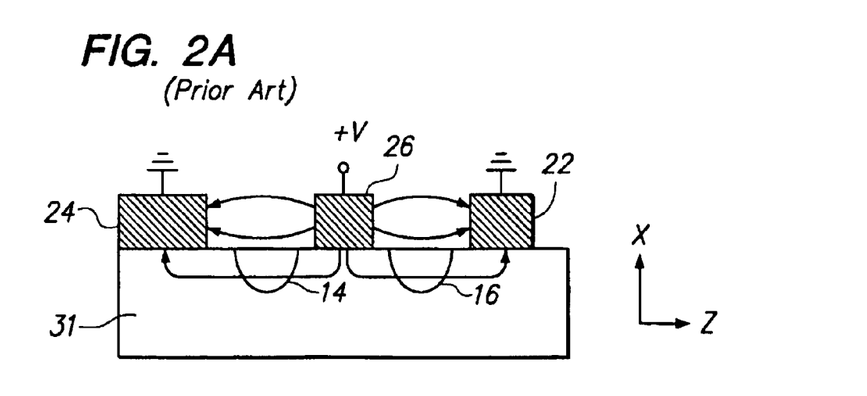
FIGS. 2(a) and 2(b) show the arrangement of electrodes and resulting electric field lines for conventional optical modulators having an x-cut and a z-cut substrate, respectively.
Figure 2B:
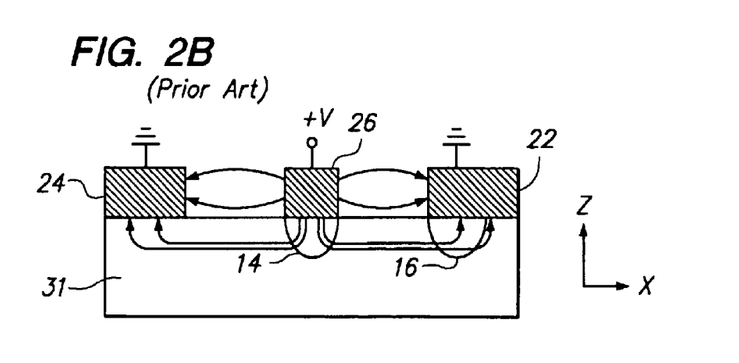

The positioning of the electrodes for both the RF electrode set and the bias electrode set relative to the interferometer arms is driven by the choice of substrate material and the manner in which the substrate material is diced. Of the various uniaxial materials used to fabricate optical modulators, lithium niobate ($LiNbO_3$) or lithium tantalate ($LiTaO_3$) are popular substrate choices. $LiNbO_3$ is widely used due to its combination of low loss characteristics, large electro-optic coefficients and high optical transparency in the near infrared wavelengths used for telecommunications. $LiNbO_3$ wafers are available in three different crystal cuts (x-, y-, and z-cut). FIGS. 2a and 2b illustrate cross-sections of x-cut and z-cut, respectively, $LiNbO_3$ substrates 31. For the most pronounced electro-optic effect, the strongest component of the applied electric field is aligned with the z-axis of the crystal (because the z-axis has the largest electro-optic coefficient) to take advantage of what is referred to in the art as the "$r_{33}$ coefficient". On z-cut $LiNbO_3$ substrates, vertical electrical fields are used with a transverse magnetic (TM) optical mode to take advantage of the $r_{33}$ coefficient, whereas in x-cut $LiNbO_3$ substrates, horizontal electrical fields and a transverse electric (TE) optical mode utilize the $r_{33}$ coefficient. This can be seen in FIG. 2(a), where MZI arm 16 is placed between electrodes 22 and 26, and arm 14 is placed between electrodes 26 and 24 such that the electric field lines passing through the waveguide arms are primarily horizontal. In FIG. 2(b), for a z-cut crystal, the RF 26 and ground electrode 24 are placed directly over waveguide arms 16 and 14 such that the electric field lines passing through the waveguide arms are substantially vertical.

Figure 3:
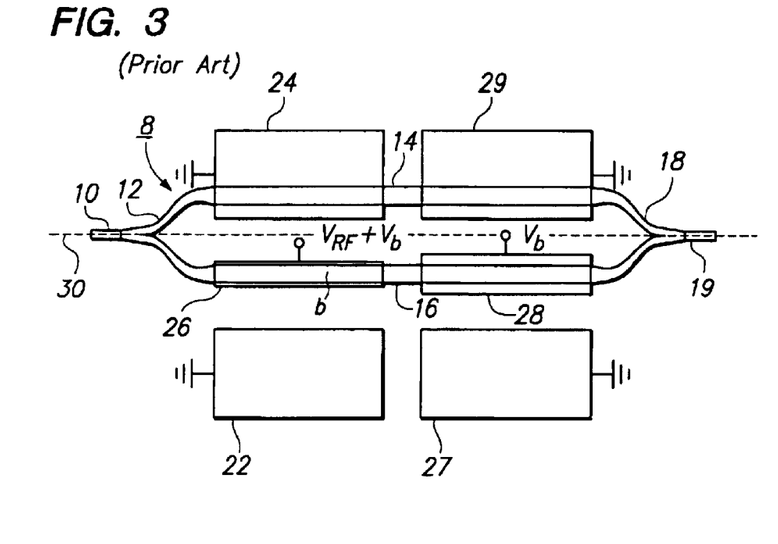
FIG. 3 shows the arrangement of an RF set of electrodes and a bias set of electrodes relative to waveguide arms in a conventional z-cut optical modulator.

FIG. 3 shows an exemplary z-cut optical modulator using an MZI having coplanar waveguide electrodes 22–26 formed over the optical waveguide 8. Electrodes 22 and 24 are grounded, while electrode 26 is supplied with an RF signal. In operation, when a carrier wave from a light source, for example a DFB laser, enters at optical waveguide input 10, the carrier power is evenly split at the first Y junction 12 into the two light channels of the MZI arms 14 and 16. By applying a voltage between the electrode 26 and ground electrodes 22 and 24, oppositely oriented electric field vectors exist in the crystal, one in each MZI arm 14 and 16. Consequently, the carrier light wave within each of the arms is complementarily phase shifted relative to one another in push-pull fashion. Light from each arm is then combined at Y junction 18 where constructive or destructive interference resulting from combining phase shifted carrier waves causes signal intensity modulation. When the total phase shift Θ between the carrier waves in arms 14 and 16 is such that Θ=π, light entering the device at input 10 radiates into the substrate and results in zero channel output at output 19.

Another set of electrodes 27–29 is also shown in FIG. 3. These electrodes provide bias control for the modulator to offset changes in the operating point of the device that cause the phase shift of the modulated carrier waves to deviate from the intended phase shift. Among other things, the operational point of the device may change due to changes in wavelength of the input optical signal. A feedback loop (not shown) samples a portion of the light from output 19, determines the actual operating point and compares that with the intended operating point to determine the amount of corrective bias voltage to apply via electrodes 27–29. As with the RF electrodes 22–26, note that the bias electrodes 27–29 in the conventional modulator of FIG. 3 are disposed in the same manner relative to the MZI arms 14 and 16, i.e., a ground electrode 29 is positioned over MZI arm 14 and an electrode driven to the bias voltage potential $V_b$ is positioned over MZI arm 16. More specifically note that the RF and bias sets of electrodes are aligned and that the centers of the potential electrodes 26 and 28 are positioned on the same side of an axis 30 running through the waveguide of the conventional z-cut optical modulator.

Although described herein as the "RF set of electrodes" and the "bias set of electrodes", those skilled in the art will appreciate that biasing of the optical modulators described herein can occur through both the RF set of electrodes and the bias set of electrodes, as well as solely via the bias set of electrodes. The former arrangement may provide an advantage in that the voltage applied via the RF and bias set of electrodes will be lower compared to using only the bias electrode set for biasing and, consequently, the optical modulator will have a reduction in voltage-dependent drift.

In the conventional Z-cut modulator of FIGS. 2(b) and 3, both the RF and bias section have the same structural asymmetry with respect to the interferometer in the sense that the hot (center) electrodes of both sections are positioned over the same interferometer arm (lower arm 16 in FIG. 3). As a result, the stress contributions of the RF and bias electrodes add to each other "in phase". When temperature varies, the total mechanical stress applied to the interferometer changes as the sum of the changes in stress introduced by each electrode section. As a result, the intrinsic phase angle of the interferometer can vary quite significantly—by as much as 120° or even more for a 60° C. temperature change. The latter is comparable to what is typically used in environmental temperature cycle testing. To compensate for a given change in the intrinsic phase angle, the bias voltage $V_b$ would have to be adjusted accordingly in order to maintain the desired operating point of the modulator, such as quadrature, maximum, minimum, or any other. For example, a 120° change in the intrinsic phase angle would require an adjustment of the bias voltage equal to ⅔ Vpi, which is typically several voltages. Such a slowly varying voltage can contribute to the voltage-dependent component of bias drift and eventually deteriorate the long-term stability of the modulator. Therefore, it is highly desirable to eliminate, or at least significantly reduce, the temperature dependence of bias.

Figure 4:
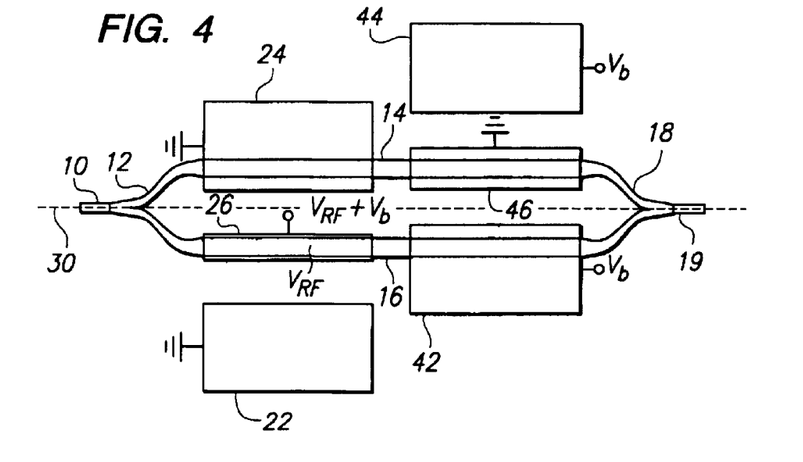
FIG. 4 shows the arrangement of an RF set of electrodes and a bias set of electrodes relative to waveguide arms in an optical modulator according to an exemplary embodiment of the present invention.

The reversible change in bias, caused as described above by a temperature-dependent electrode stress, can be significantly reduced by the present invention, one exemplary embodiment of which is shown in FIG. 4. As seen, the set of bias electrodes 42–46 is offset in such a way that the center electrode 46 of the bias section is positioned over the upper arm 14 while the center electrode 26 of the set of RF electrodes 22–26 is positioned over the lower arm 16. Also note that in the set of bias electrodes 42–46, the center electrode is grounded while the two outer electrodes 42 and 44 are held at the bias voltage $V_b$. Compare this exemplary embodiment of the present invention with the conventional bias electrode arrangement in FIGS. 2(b) and 3. In the conventional arrangement, the center electrode 28 of the bias set of electrodes 27–29 is positioned over the same interferometer arm as the center electrode 26 of the RF set of electrodes 22–26. Moreover, the conventional arrangement uses the same polarity pattern for both the RF set of electrodes as the bias set of electrodes, i.e., the "hot" electrode is centered between two ground electrodes.

The changes illustrated in FIG. 4, offset and reversed polarity of the bias section, ensure that the RF and bias sections contribute "out of phase" mechanically but "in phase" electro-optically. Since the bias set of electrodes 42–44 is offset with respect to the positioning of the RF set of electrodes 22–26 relative to the waveguide arm 14 and 16, the direction of the stress-induced bias change caused by the bias section will be opposite to that caused by the RF section. Thus, the total temperature-induced change in operating point will be reduced, or even completely eliminated if the impact of the bias section completely compensates that of the RF section. At the same time, the electro-optic modulation of the bias section adds to that induced by the RF electrode. Therefore, both electrodes can be used for biasing, just as in the standard scheme.

Figure 5A:
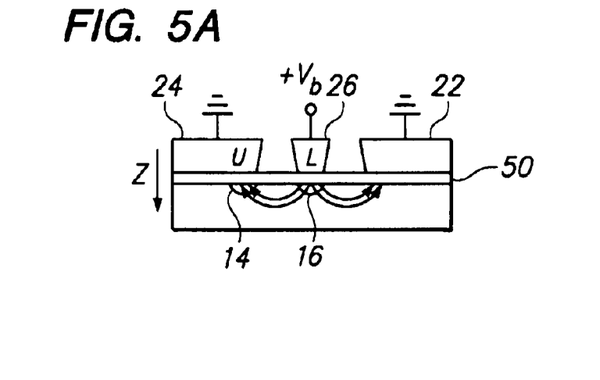
FIG. 5(a) is a cross-section of the device of FIG. 4 taken through the RF set of electrodes which shows exemplary electric field lines therebetween.
Figure 5B:
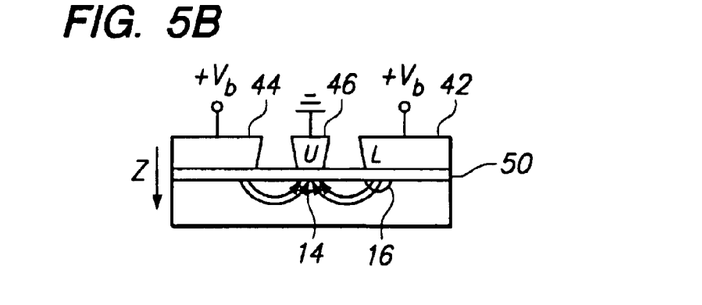
FIG. 5(b) is a cross-section of the device of FIG. 4 taken through the bias set of electrodes which shows exemplary electric field lines therebetween.

FIGS. 5(a) and 5(b) illustrate the distribution of electric field lines for the RF and bias sections of the exemplary embodiment of FIG. 4, respectively. It can be noted from these figures that the RF set of electrodes 22–26 imparts electro-optic modulation primarily by decreasing the index of the lower waveguide arm 16, while the bias set of electrodes 42–46 mostly by increasing the index of the upper waveguide arm 14. In both cases, the differential phase, i.e. the phase difference between the upper and lower arm, increases with applied voltage. Thus, the electro-optic modulation of the RF set of electrodes 22–26 adds in phase to that of the bias set of electrodes 42–46. Also seen in FIGS. 5(a) and 5(b) is an insulation buffer film 50, such as $SiO_2$ or $Al_2O_3$, which may be used as a buffer to minimize z-cut $LiNbO_3$ optical losses that occur through TM mode absorption in the electrode metal. Buffer films may also be beneficial in x-cut $LiNbO_3$ devices operating at high frequency.

Figure 6:
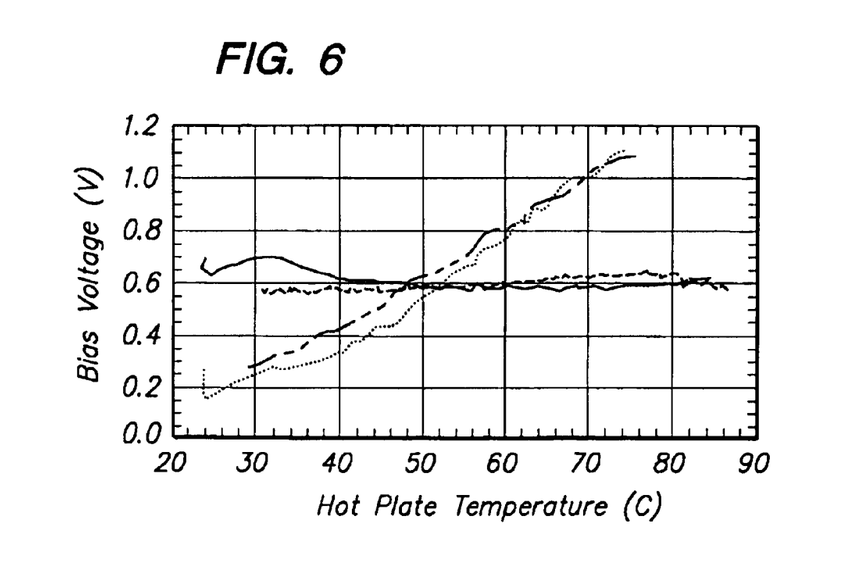
FIG. 6 is a graph depicting bias voltage as a function of temperature of conventional (dotted lines) and inventive (solid lines) optical modulators for a first test run.

Applicant has tested exemplary embodiments of the present invention to determine their efficacy in reducing or eliminating the temperature dependence of bias control in optical modulators. For this test, an array of Mach-Zehnder interferometers was formed in Z-cut $LiNbO_3$ with each modulator having an identical RF electrode and either a conventional or a bias section modified in accordance with the present invention. The modulators were temperature cycled on a hot plate between room temperature (RT) and about 85° C. During temperature cycling, the operating point of the device under test was maintained at the maximum of the transfer curve by using a feedback loop including a fiber-optic coupler and bias controller. The voltage generated by the bias controller and applied to both the RF and bias sections was recorded versus temperature. The half-wave voltage $V_\pi$ of the combined (RF+bias) electrode was determined in a separate measurement. $V_\pi$ of both the conventional and the modified optical modulators was the same, confirming that the RF and bias electrodes contributed in-phase electro-optically. The temperature-dependent bias variation was calculated in degrees as $\Delta\omega(T)=(V(T)-V_{RT})/V_\pi*180°$, where $V(T)$ and $V_{RT}$ are the bias voltages at temperature T and room temperature, respectively. FIG. 6 shows the measured dependence of bias versus temperature, wherein the dotted lines represent the results for conventional devices and the solid lines represent results for optical modulators having a bias set of electrodes arranged according to the present invention. Therein it can be seen that while the bias voltage changed significantly as a function of temperature for the conventional optical modulators, it remained relatively stable as a function of temperature for modulators according to the present invention.

Figure 7:
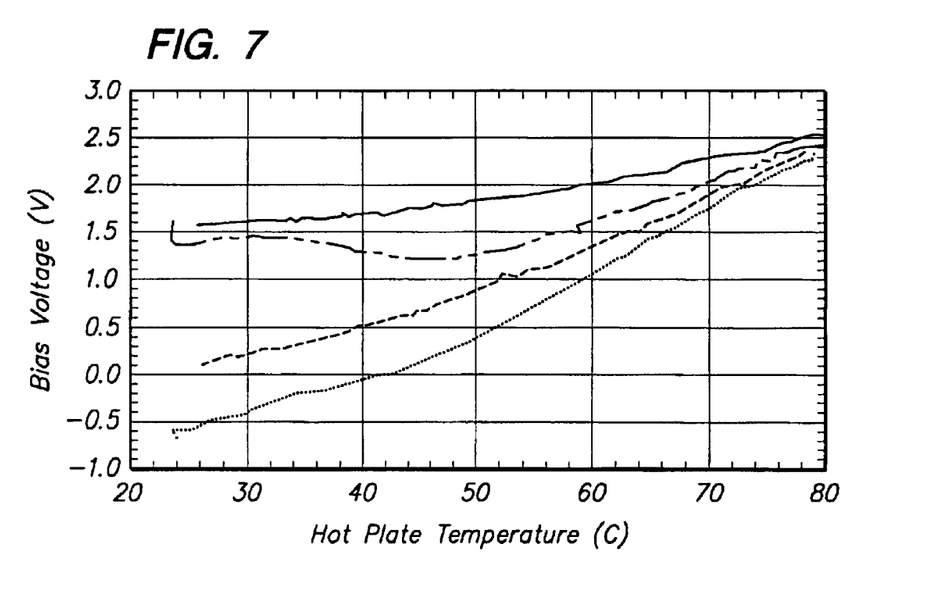
FIG. 7 is a graph depicting bias voltage as a function of temperature of conventional (dotted lines) and inventive (solid lines) optical modulators for a second test run.

Applicant recognizes, however, that the ability of modulators according to the present invention to reduce the temperature-dependent nature of bias control will depend on how well the temperature-induced stresses in the bias set of electrodes match the temperature-induced stresses in the RF set of electrodes. Thus, for modulators wherein the asymmetries are such that a good match does not occur it is expected that the bias voltage will vary somewhat more as a function of temperature than the test recorded in FIG. 6 depicts. Nonetheless the temperature performance of modulators constructed in accordance with the present invention is still expected to greatly exceed that of modulators fabricated in accordance with the conventional techniques of FIGS. 2(b) and 3. Such an example is seen in FIG. 7 for another set of conventional modulators and modulators designed in accordance with the present invention. These devices were tested in a similar manner to that described above with respect to the graph of FIG. 6 and, again, the dotted lines represent the results for conventional devices and the solid lines represent results for optical modulators having a bias set of electrodes arranged according to the present invention. In the example of FIG. 7, it can be seen that the bias voltage for the modulators fabricated in accordance with the present invention does vary as a function of temperature, however the variance is still much less than that of the conventional devices.

Figure 8:
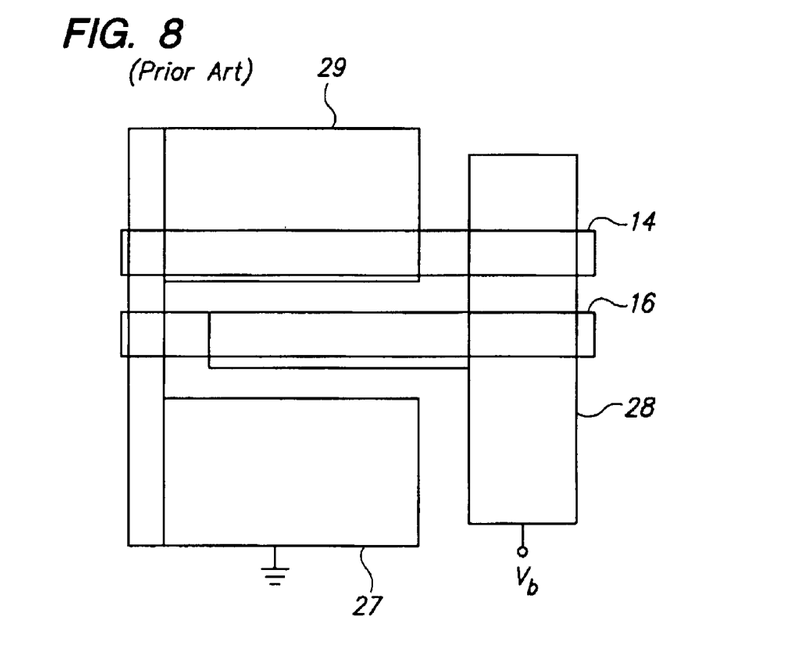
FIG. 8 depicts a conventional set of bias electrodes from a packaging perspective.
Figure 9:
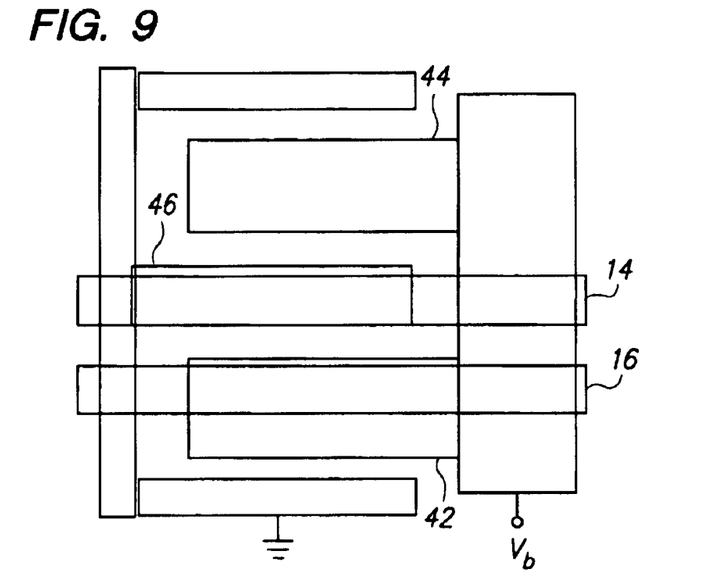
FIG. 9 depicts a set of bias electrodes according to an exemplary embodiment of the present invention from a packaging perspective.

Optical modulators are typically sold in commercial packages with ground and voltage contacts. FIG. 8 illustrates a manner in which conventional bias electrodes are laid out in a package to provide for a ground contact and a voltage contact on the same side of the package. Ideally, although not required for the present invention, modulators fabricated in accordance with the present invention could be provided with contact pads disposed at substantially the same package position as their conventional counterparts. An example of an electrode layout which supports this concept is shown in FIG. 9, wherein a ground contact and a voltage contact are provided on the same side of the package as the contacts shown in FIG. 8, while also providing for the offset electrical and physical connections for bias electrode arrangements according to the present invention.

Figure 10:
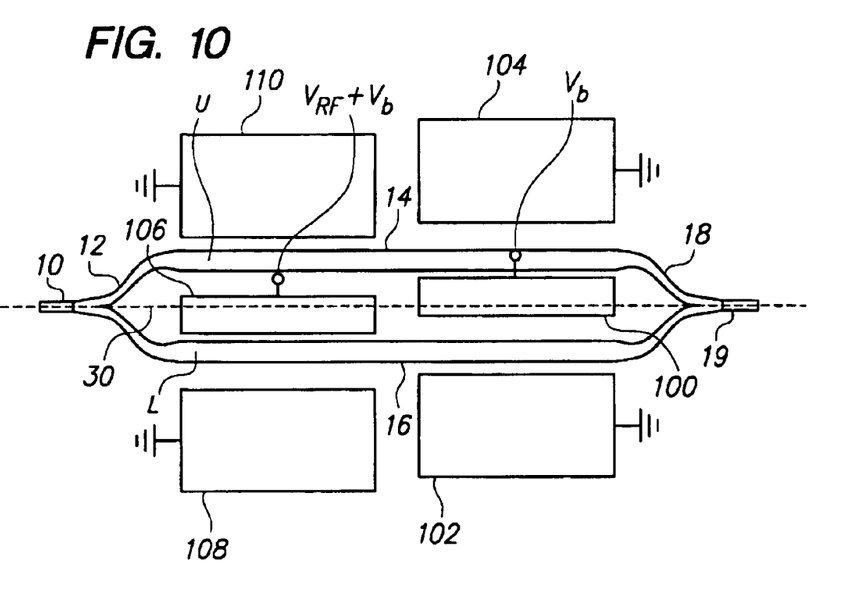
FIG. 10 depicts an RF electrode and bias electrode layout for optical modulators according to another exemplary embodiment of the present invention.

FIG. 10 depicts another exemplary embodiment of the present invention wherein an x-cut substrate is employed. Therein, the interferometer arms are positioned substantially in the electrode gaps and TE-polarized light is provided to the modulator in order to utilize the $r_{33}$ coefficient The RF electrode set 106–110 is offset with respect to interferometer arms 14 and 16 in order to cause chirp, i.e., both phase and amplitude modulation, in the optical output. Chirp is typically used to offset the impact of dispersion in fiber-optic transmission links. The offset of the RF electrode set creates an unbalanced mechanical strain of arms 14 and 16. If not compensated, this unbalanced strain would result in a strong temperature dependence of bias. In the exemplary embodiment of FIG. 10, compensation is provided by offsetting the bias set of electrodes 100–104 in the direction opposite from the offset of the RF electrode set. More specifically, it can be seen that the center of the RF potential electrode 106 is offset to one side of axis 30 by a spacing which is substantially less than a spacing between the two waveguide arms 14 and 16, while the center of the bias potential electrode 100 is offset to the other side of axis 30 by a similar spacing. Unlike the embodiment of FIG. 4, in this exemplary embodiment the bias set of electrodes 102–104 and the RF set of electrodes 106–110 share the same electrical configuration, i.e., the center electrodes 100 and 106 are the potential electrodes and the outer electrodes 102, 104, 108 and 110 are the ground electrodes.

Figure 11:
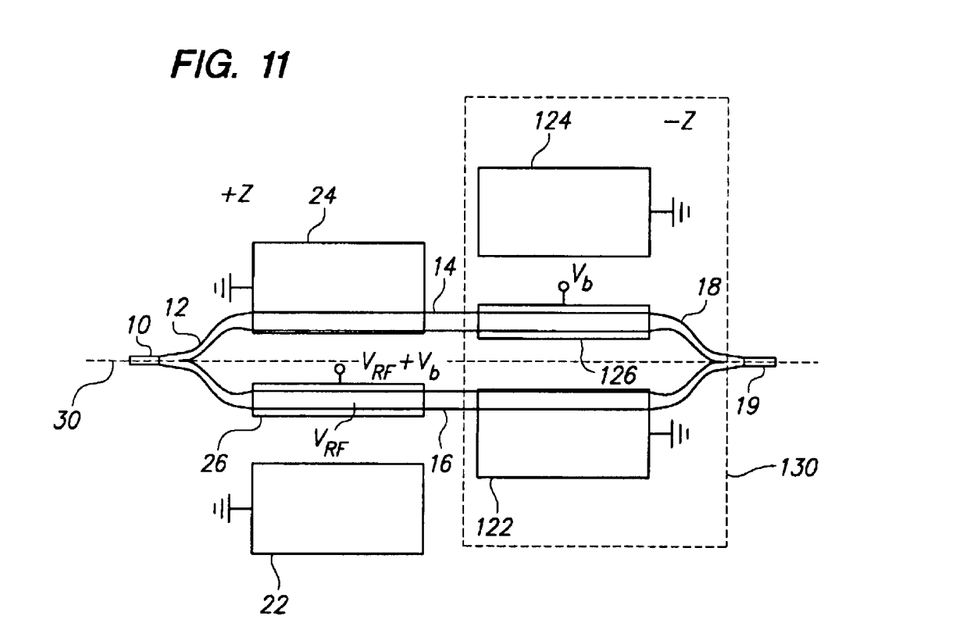
FIG. 11 depicts an RF electrode and bias electrode layout for optical modulators according to a still further exemplary embodiment of the present invention.

FIG. 11 illustrates another z-cut exemplary embodiment of the present invention. In this embodiment, as in the embodiment of FIG. 10, the bias and RF set of electrodes share the same electrical configuration, i.e., the center electrodes 26 and 126 are the potential electrodes and the outer electrodes 22, 24, 122 and 124 are the ground electrodes. Here, the centers of the potential electrodes 26 and 126 are again disposed on opposite sides of axis 30 and offset from one another by a spacing which is substantially similar to the spacing between the waveguide arms 14 and 16. Since the polarity of the electrodes is the same in both sets of electrodes, the optical axis in the area 130 of the substrate in which the bias set of electrodes is disposed should be reversed relative to the optical axis in the area of the substrate in which the RF set of electrodes is disposed. Various techniques can be applied to flip the optical polarity of a section of the substrate, e.g., electric field poling or proton exchange.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. An optical modulator comprising:
    a substrate;
    an optical waveguide formed in the substrate;
    a first set of electrodes provided on said substrate proximate said optical waveguide for establishing an electric field therebetween to modulate said optical signal, said first set of electrodes including two ground electrodes and one RF potential electrode; and
    a second set of electrodes provided on said substrate proximate said optical waveguide for establishing an electric field therebetween to bias said optical modulator, said second set of electrodes including one ground electrode and two bias potential electrodes,
    wherein said first set of electrodes and said second set of electrodes are physically offset relative to one another.

2. The optical modulator of claim 1, wherein said substrate is formed from one of $LiNbO_3$ and $LiTaO_3$.

3. The optical modulator of claim 1, wherein said substrate is an x-cut substrate.

4. The optical modulator of claim 1, wherein said substrate is a z-cut substrate.

5. The optical modulator of claim 1, wherein said optical modulator is a Mach-Zehnder type modulator.

6. The optical modulator claim 1, wherein said optical waveguide further comprises:
    an input for receiving an optical signal to be modulated, a first junction for splitting the input into first and second waveguide arms, a second junction for joining the first and second waveguide arms, and an output extending from the second junction for outputting a modulated form of said optical signal.

7. The optical modulator of claim 6, wherein said RF potential electrode in said first set of electrodes is positioned over said first waveguide arm and said one ground electrode in said second set of electrodes is positioned over said second waveguide arm.

8. The optical modulator of claim 7, wherein said two ground electrodes in said first set of electrodes are disposed on either side of said RF potential electrode.

9. The optical modulator of claim 7, wherein said two bias potential electrodes in said second set of electrodes are disposed on either side of said one ground electrode.

10. The optical modulator of claim 1, wherein said one RF potential electrode and said two bias potential electrodes are connected to first and second contact pads.

11. The optical modulator of claim 1, wherein said first set of electrodes is also for biasing said modulator.

12. An optical modulator comprising:

a substrate;

an optical waveguide formed in the substrate;

a first set of electrodes provided on said substrate for establishing an electric field therebetween to modulate said optical signal, said first set of electrodes including two ground electrodes and one RF potential electrode; and a second set of electrodes provided on said substrate for establishing an electric field therebetween to bias said optical modulator, said second set of electrodes including two ground electrodes and one bias potential electrode;

wherein a center of said one RF potential electrode is offset from a center of said one bias potential electrode by a predetermined distance relative to an axis running through said optical waveguide.

13. The optical modulator of claim 12, wherein said substrate is formed from one of $LiNbO_3$ and $LiTaO_3$.

14. The optical modulator of claim 12, wherein said wherein the optical waveguide includes a first section for receiving an optical signal to be modulated, a first junction for splitting the first section into first and second waveguide arms, a second junction for joining the first and second waveguide arms, and a second section extending from the second junction for outputting a modulated form of said optical signal.

15. The optical modulator of claim 14, wherein said substrate is a z-cut substrate and said predetermined spacing is substantially equal to a spacing between said first waveguide arm and said second waveguide arm.

16. The optical modulator of claim 15, wherein a portion of said substrate proximate said second set of electrodes has an optical axis which is reversed relative to a portion of the substrate proximate said first set of electrodes.

17. The optical modulator of claim 14, wherein said substrate is an x-cut substrate and said predetermined spacing is substantially less than a spacing between said first waveguide arm and said second waveguide arm.

18. The optical modulator of claim 12, wherein said optical modulator is a Mach-Zehnder type modulator.

19. The optical modulator of claim 12, wherein said first set of electrodes is also for biasing said modulator.

20. An optical modulator comprising:

waveguide means for guiding optical energy through said optical modulator;

electrical modulation means for modulating said optical energy, and bias means for biasing said optical modulator, wherein said electrical modulation means and said bias means are arranged in a manner which reduces a temperature dependence of said bias means, and wherein said electrical modulation means and said bias means are arranged to have at least one of: (1) reverse polarities; (2) reverse optical axes in an underlying substrate; and (3) a center of one RF potential electrode offset from a center of one bias potential electrode by a predetermined distance relative to an axis running through said waveguide means.

21. The optical modulator of claim 20, wherein said electrical modulation means and said bias means are arranged to have reverse polarities, such that said electrical modulation means includes two ground electrodes and one potential electrode and said bias means includes one potential electrode and two ground electrodes.

22. The optical modulator of claim 20 wherein said electrical modulation means and said bias means are arranged to be physically offset relative to one another.

23. The optical modulator of claim 20, further comprising an x-cut substrate.

24. The optical modulator of claim 20, further comprising a z-cut substrate.

25. The optical modulator of claim 20, wherein said optical modulator is a Mach-Zehnder type modulator.

26. A method for making optical modulators comprising the steps of:

providing a substrate;

forming a waveguide in said substrate for guiding optical energy through said optical modulator;

disposing a first set of electrodes on said substrate for modulating said optical energy;

disposing a second set of electrodes on said substrate for biasing said optical modulator; and arranging said first set of electrodes and said second set of electrodes to reduce a temperature dependence of said biasing of said optical modulator, and wherein said first set of electrodes and said second set of electrodes are arranged to have at least one of: (1) reverse polarities; (2) reverse optical axes in an underlying substrate; and (3) a center of one RF potential electrode in said first set offset from a center of one bias potential electrode in said second set by a predetermined distance relative to an axis running through said waveguide.

27. The method of claim 26, wherein said step of arranging further comprises:

arranging said first set of electrodes and said second set of electrodes to have reverse polarities, such that said first set of electrodes includes two ground electrodes and one potential electrode and said second set of electrodes includes one potential electrode and two ground electrodes.

28. The method of claim 26, wherein said step of arranging further comprises:

physically offsetting said first set of electrodes relative to said second set of electrodes.

29. The method of claim 26, wherein said step of providing a substrate further comprises the step of providing an x-cut substrate.

30. The method of claim 26, wherein said step of providing a substrate further comprises the step of providing a z-cut substrate.

31. The method of claim 26, wherein said optical modulator is a Mach-Zehnder type modulator.

* * * * *